United States Patent
Bickley

(10) Patent No.: US 11,891,959 B2
(45) Date of Patent: Feb. 6, 2024

(54) FUEL CONTROL SYSTEM

(71) Applicant: ROLLS-ROYCE plc, London (GB)

(72) Inventor: Daniel J Bickley, Solihull (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 17/983,874

(22) Filed: Nov. 9, 2022

(65) Prior Publication Data
US 2023/0175443 A1 Jun. 8, 2023

(30) Foreign Application Priority Data
Dec. 8, 2021 (GB) ..................................... 2117691

(51) Int. Cl.
F02C 9/00 (2006.01)
F02C 9/26 (2006.01)
F02C 9/46 (2006.01)
F02C 7/232 (2006.01)

(52) U.S. Cl.
CPC .............. F02C 9/263 (2013.01); F02C 7/232 (2013.01); F02C 9/46 (2013.01); F05D 2220/323 (2013.01); F05D 2240/35 (2013.01); F05D 2270/05 (2013.01); F05D 2270/07 (2013.01)

(58) Field of Classification Search
CPC ............. F02C 9/263; F02C 9/46; F02C 7/232
See application file for complete search history.

(56) References Cited

U.S. PATENT DOCUMENTS 5,088,278 A * 2/1992 Smith ....................... F02C 9/58
60/39.281
5,235,806 A 8/1993 Pickard
6,205,766 B1 * 3/2001 Dixon ....................... F02C 9/46
60/39.091
2008/0067463 A1 3/2008 Jones et al.
2008/0296403 A1 12/2008 Futa, Jr. et al.
2010/0158707 A1 * 6/2010 Griffiths .................... F02C 9/46
417/222.1

FOREIGN PATENT DOCUMENTS

WO 2010/056241 A1 5/2010

OTHER PUBLICATIONS

Apr. 26, 2023 Extended Search Report issued in European Patent Application No. 22206033.7.
May 24, 2022 Search Report issued in British Patent Application No. 2117691.2.

* cited by examiner

Primary Examiner — Katheryn A Malatek
(74) Attorney, Agent, or Firm — Oliff PLC

(57) ABSTRACT

A fuel control system for a gas turbine engine includes a fuel metering valve, a pressure raising and shut-off valve (PR-SOV), and a shutoff effector including a first stage unit that is electrically powered and a second stage unit that is controlled by the first stage unit. The second stage unit actuates a valve member of the PRSOV between an open position that allows supply of a fuel to burners of the gas turbine engine and a closed position that prevents supply of the fuel to the burners. Upon loss of electrical power to the first stage unit during operation of the gas turbine engine, the first stage unit is configured to: control the second stage unit to actuate the valve member of the PRSOV to the closed position after a predetermined time duration; or retain the valve member of the PRSOV in the open position.

18 Claims, 7 Drawing Sheets

FUEL CONTROL SYSTEM

This specification is based upon and claims the benefit of priority from UK Patent Application Number 2117691.2 filed on 8 Dec. 2021, the entire contents of which are incorporated herein by reference.

BACKGROUND

Field of the Disclosure

The present disclosure relates to a fuel control system, and in particular to a fuel control system for a gas turbine engine.

Background of the Disclosure

A fuel control system for a gas turbine engine may provide the gas turbine engine with a fuel in a suitable form for combustion and may control a flow rate of the fuel for accurate control of an engine speed of the gas turbine engine.

The fuel control system may include electrical components and mechanical/hydraulic components that are controlled by the electrical components. As a result, the fuel control system may need to be designed to continue supply of the fuel to the gas turbine engine for at least a time duration from loss of electrical power to the electrical components (e.g., during transient loss of electrical power) in order to prevent an undesired perturbation in thrust produced by the gas turbine engine.

Conventional fuel control systems may be designed for one of a fail-down application and a fail-fixed application. In the fail-down application, the conventional fuel control systems may be designed to decrease supply of the fuel to the gas turbine engine upon loss of electrical power to the electrical components. In the fail-fixed application, the conventional fuel control systems may be designed to continuously supply the fuel to the gas turbine engine upon loss of electrical power to the electrical components.

However, the conventional fuel control systems designed for the fan-down application may include components, such as housings, metering components, sensors, etc., having substantially different physical forms and interfaces as compared to components of the conventional fuel control systems designed for the fail-fixed application.

Therefore, there may be a need to provide a fuel control system with common components and interfaces for both the fail-fixed application and the fail-down application, such that the fuel control system can be easily configured for one of the fail-fixed application and the fail-down application without requiring complex adapters and complicated modifications.

SUMMARY OF THE DISCLOSURE

In a first aspect, there is provided a fuel control system for a gas turbine engine. The fuel control system includes a fuel metering valve. The fuel metering valve includes a valve body configured to adjust a flow of a fuel between a supply line and a delivery line. The fuel metering valve further includes a valve actuating unit configured to move the valve body. The valve actuating unit is electrically powered. The fuel metering valve further includes a valve detent configured to retain the valve body in a current body position of the valve body upon loss of electrical power to the valve actuating unit. In some cases, the current body position of the valve body 142 may be a nearest detent position. The fuel control system further includes a pressure raising and shut-off valve (PRSOV) fluidly connected to the delivery line. The PRSOV includes a valve member movable between an open position and a closed position. In the open position, the valve member allows the flow of the fuel from the delivery line to an engine line that is in fluid communication with one or more burners of the gas turbine engine. The open position of the valve member therefore refers to any position of the valve member in which the valve member allows the flow of the fuel from the delivery line to the engine line. That is, in the open position of the valve member, the PRSOV may be either partially or fully open, depending on operating conditions of the gas turbine engine. In the closed position, the valve member prevents the flow of the fuel from the delivery line to the engine line. The fuel control system further includes a shutoff effector. The shutoff effector includes a first stage unit that is electrically powered. The shutoff effector further includes a second stage unit fluidly connected to the PRSOV and controlled by the first stage unit. The second stage unit is configured to actuate the valve member of the PRSOV. The second stage unit includes a spool movable between a first spool position and a second spool position. In the first spool position of the spool, the valve member of the PRSOV is in the open position. In the second spool position of the spool, the valve member of the PRSOV is in the closed position. Upon loss of electrical power to the first stage unit when the spool is in the first spool position: the first stage unit is configured to control the second stage unit to move the spool to the second spool position over a predetermined time duration from loss of electrical power to the first stage unit, such that the valve member of the PRSOV moves to the closed position after the predetermined time duration and allows the flow of the fuel from the delivery line to the engine line during the predetermined time duration, and after the predetermined time duration, the valve member of the PRSOV is at the closed position to prevent the flow of the fuel from the delivery line to the engine line; or the first stage unit is configured to control the second stage unit to retain the spool in the first spool position, such that the valve member of the PRSOV is retained in the open position.

The fuel control system may be configured for one of a fail-down application and a fail-fixed application. Specifically, the first stage unit of the shutoff effector may be configured such that the fuel control system can be used for one of the fail-down application and the fail-fixed application.

For the fail-down application, upon loss of electrical power to the first stage unit when the spool is in the first spool position, the first stage unit is configured to control the second stage unit to move the spool to the second spool position over the predetermined time duration from loss of electrical power to the first stage unit, such that the valve member of the PRSOV moves to the closed position after the predetermined time duration and allows the flow of the fuel from the delivery line to the engine line during the predetermined time duration. After the predetermined time duration, the valve member of the PRSOV is at the closed position to prevent the flow of the fuel from the delivery line to the engine line.

The first stage unit and the second stage unit may be configured such that the predetermined time duration is at least greater than a duration of a transient loss of electrical power to the first stage unit. Such transient loss of electrical power may occur due to, for example, switching of a power source (e.g., ground cart, battery, onboard generators, etc.) for an airframe power bus or reset of the airframe power bus due to a consumer fault.

In some embodiments, the predetermined time duration is greater than or equal to 100 milliseconds.

For the fail-fixed application, upon loss of electrical power to the first stage unit when the spool is in the first spool position, the first stage unit is configured to control the second stage unit to retain the spool in the first spool position, such that the valve member of the PRSOV is retained in the open position.

For the fail-down application, the first stage unit may include a proportional device to decrease fuel delivery upon loss of electrical power to the first stage unit. In some embodiments, the first stage unit includes a four-way proportional servo-valve. For the fail-fixed application, the first stage unit may include a latching device to maintain fuel delivery upon loss of electrical power to the first stage unit. For example, the first stage unit (the latching device) may include a magnetic latch movable between a first latch position corresponding to the first spool position and a second latch position corresponding to the second spool position. The magnetic latch may be configured to retain its position with no electrical power supplied to the first stage unit. As a result, upon loss of electrical power to the first stage unit when the magnetic latch is in the first latch position, the magnetic latch may retain the first latch position thereof, such that the spool is retained in the first spool position, and the valve member of the PRSOV is retained in the open position. An electrical transient may be required to overcome the magnetic latch in order to move the magnetic latch to the second latch position thereof. Upon loss of electrical power to the first stage unit when the magnetic latch is in the second latch position, the magnetic latch may retain the second latch position thereof, such that the spool is retained in the second spool position, and the valve member of the PRSOV is retained in the closed position.

In one example, incorporating a latch member in the first stage unit may switch the fuel control system from the fail-down application to the fail-fixed application while other components of the fuel control system and configurations thereof remain the same. Moreover, removing the latch member from the first stage unit may switch the fuel control system from the fail-fixed application to the fail-down application.

Advantageously, the fuel control system may permit respective configurations of the first stage unit for the fail-down application and the fail-fixed application to have a common hydraulic and mechanical interface. As a result, the fuel control system may be accommodated in a common fuel control housing, i.e., the fuel control system may not require a change in the fuel control housing to accommodate the respective configurations of the first stage unit for the fail-down application and the fail-fixed application. Therefore, the fuel control system may allow a single design of the fuel control housing to be used with the common hydraulic and mechanical interface for both the fail-fixed application and the fail-down application, thereby eliminating a need to use complex adapters to switch the fuel control system between the fail-fixed application and the fail-down application or a need to have a completely new design of the fuel control housing.

Moreover, the fuel control system may further permit use of a common fuel metering valve (e.g., a rotary valve) for both the fail-down application and the fail-fixed application. In some embodiments, the valve actuating unit includes an electric motor operatively coupled to the valve body. For example, the fuel metering valve may include a rotary valve, and the electric motor may include a stepper motor driving a rotary plate valve to provide a variable area orifice required for fuel metering. The stepper motor may employ step counting for position measurement of the valve body. Advantageously, the fuel metering valve of the fuel control system may have low complexity and low mass, as the fuel metering valve may not require additional devices/sensors for position measurement of the valve body. Furthermore, in some embodiments, the valve detent includes a magnetic detent. The magnetic detent may magnetically retain the valve body in the current body position of the valve body upon loss of electrical power to the valve actuating unit.

In some embodiments, the first stage unit includes a movable member movable at least between a first end position corresponding to the first spool position of the spool of the second stage unit and a second end position corresponding to the second spool position of the spool of the second stage unit.

As described above, in the first spool position of the spool, the valve member of the PRSOV is in the open position, and in the second spool position of the spool, the valve member of the PRSOV is in the closed position. By moving the movable member of the first stage unit to the second end position, the spool may move to the second spool position, and the valve member of the PRSOV may move to the closed position. Therefore, the movable member may be actuated to rapidly shutoff the flow of the fuel from the delivery line to the engine line to rapidly shutdown the gas turbine engine.

The first stage unit further includes a stage actuating unit configured to actuate the movable member between the first end position and the second end position. The stage actuating unit is electrically powered, such that loss of electrical power to the first stage unit corresponds to loss of electrical power to the stage actuating unit. In the first end position of the movable member, the first stage unit controls the second stage unit to move the spool to the first spool position. In the second end position of the movable member, the first stage unit controls the second stage unit to move the spool to the second spool position.

In some embodiments, the stage actuating unit includes one or more coils that are electrically powered. The one or more coils actuate the movable member to the first end position when the one or more coils are energized to a first current level. The one or more coils actuate the movable member to the second end position when the one or more coils are energized to a second current level different from the first current level. Loss of electrical power to the stage actuating unit causes a zero current level in the one or more coils.

In some embodiments, upon loss of electrical power to the stage actuating unit, the movable member moves to a neutral position between the first end position and the second end position. Upon loss of electrical power to the stage actuating unit when the movable member is in the first end position, the movable member moves to the neutral position. Upon a movement of the movable member from the first end position to the neutral position, the spool of the second stage unit moves to the second spool position over the predetermined time duration and the valve member of the PRSOV moves to the closed position after the predetermined time duration.

For both the fail-fixed application and the fail-down application, it may be important for the fuel control system to be able to actively shut off fuel flow to the gas turbine engine in a short period of time, for example, to prevent overspeed of the gas turbine engine.

In some embodiments, upon the movement of the movable member from the first end position to the second end position, the spool moves from the first spool position to the second spool position within a shutdown time duration, and the valve member of the PRSOV moves from the open position to the closed position within the shutdown time duration. The predetermined time duration is greater than the shutdown time duration by a factor of at least 10.

For example, if the predetermined time duration is 100 milliseconds, the shutdown time duration may be less than 10 milliseconds. This may ensure that the gas turbine engine rapidly enters a shutdown state when required. Therefore, the fuel control system may prevent shutoff of fuel flow when electrical power is transiently lost for the fail-down application while allowing rapid shutoff to manage potential engine overspeed conditions.

In some embodiments, the first stage unit further includes a latch member operatively coupled to the movable member. Upon loss of electrical power to the stage actuating unit when the movable member is in the first end position, the latch member retains the movable member in the first end position, such that the spool is retained in the first spool position and the valve member of the PRSOV is retained in the open position. The latch member may therefore enable the fuel control system to be used for the fail-fixed application.

In some embodiments, the first stage unit further includes a fluid chamber at least partially receiving the movable member therein. The first stage unit further includes a first chamber port fluidly communicating with the fluid chamber. The movable member is configured to close the first chamber port in the first end position. The first stage unit further includes a second chamber port fluidly communicating with the fluid chamber. The movable member is configured to close the second chamber port in the second end position. The first stage unit further includes a third chamber port fluidly communicating with the fluid chamber. The third chamber port is open irrespective of a position of the movable member. The first stage unit further includes a first input port configured to receive a high pressure fuel flow from the supply line and fluidly connected with each of the first chamber port and the second chamber port. The first stage unit further includes a second input port configured to receive a low pressure fuel flow from a low pressure line and fluidly connected to the third chamber port. The first stage unit further includes a first output port fluidly connected to the first chamber port. The first stage unit further includes a second output port fluidly connected to the second chamber port.

In some embodiments, the first stage unit further includes a first orifice fluidly disposed between the first input port and the first chamber port. The first stage unit further includes a second orifice fluidly disposed between the first input port and the second chamber port.

In some embodiments, the second stage unit further includes a housing movably receiving the spool therein. The housing includes a first port fluidly connected to an intermediate pressure line and a second port fluidly connected to the PRSOV. The housing and the spool define a first end chamber fluidly connected to the first output port of the first stage unit and a second end chamber fluidly connected to the second output port of the first stage unit. The first and second end chambers are disposed on opposing sides of the spool. The housing and the spool further define an annular chamber disposed between the first and second end chambers and disposed in fluid communication with the first port. The spool fluidly separates the first end chamber, the second end chamber, and the annular chamber from each other. In the first spool position, the spool fluidly separates the second port from the annular chamber, such that the second port is fluidly disconnected from the first port. In the second spool position, the spool fluidly connects the second port to the annular chamber, such that the second port is fluidly connected with the first port via the annular chamber. The second stage unit further includes a biasing member received within the second end chamber and configured to bias the spool towards the second spool position. In the first end position of the movable member, a fluid pressure within the first end chamber is higher than a fluid pressure within the second end chamber, such that the spool is in the first spool position against a biasing of the biasing member. In the second end position of the movable member, the fluid pressure within the first end chamber is less than or equal to the fluid pressure within the second end chamber, such that the spool is in the second spool position.

In some examples, the second stage unit may further include a sleeve (e.g., a cylindrical sleeve) disposed within the housing and receiving the spool therein. The second stage unit may further include one or more elastomeric seals disposed between the housing and an outer surface of the sleeve to provide a seal therebetween, and to prevent leakage of different fuel pressures stacked axially along a length of the spool. The ports (e.g., the first and second ports) may be further defined on the sleeve to convey the fuel through the sleeve.

In some embodiments, upon loss of electrical power to the stage actuating unit, the movable member moves to the neutral position between the first end position and the second end position, such that each of the first and second chamber ports is open. Upon loss of electrical power to the stage actuating unit when the movable member is in the first end position, the movable member moves to the neutral position from the first end position. Further, upon the movement of the movable member from the first end position to the neutral position, the fluid pressure within the first end chamber tends to equalize with the fluid pressure within the second end chamber, such that the spool of the second stage unit moves to the second spool position over the predetermined time duration and the valve member of the PRSOV moves to the closed position after the predetermined time duration.

In some embodiments, the fuel control system further includes a pull-down orifice fluidly disposed between the delivery line and the intermediate pressure line, such that the pull-down orifice is fluidly connected to the first port via the intermediate pressure line.

In some embodiments, the fuel control system further includes a pump fluidly configured to provide a high pressure fuel flow to the supply line. The fuel control system further includes a spill valve fluidly connected to the intermediate pressure line and configured to control a fuel flow between the supply line and the pump based on a fluid pressure in the intermediate pressure line.

In some embodiments, the fuel control system further includes a controller configured to control at least the valve actuating unit of the fuel metering valve and the first stage unit of the shutoff effector. The controller may include an electronic engine controller (EEC).

In a second aspect, there is provided a gas turbine engine for an aircraft. The gas turbine engine includes the fuel control system of the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
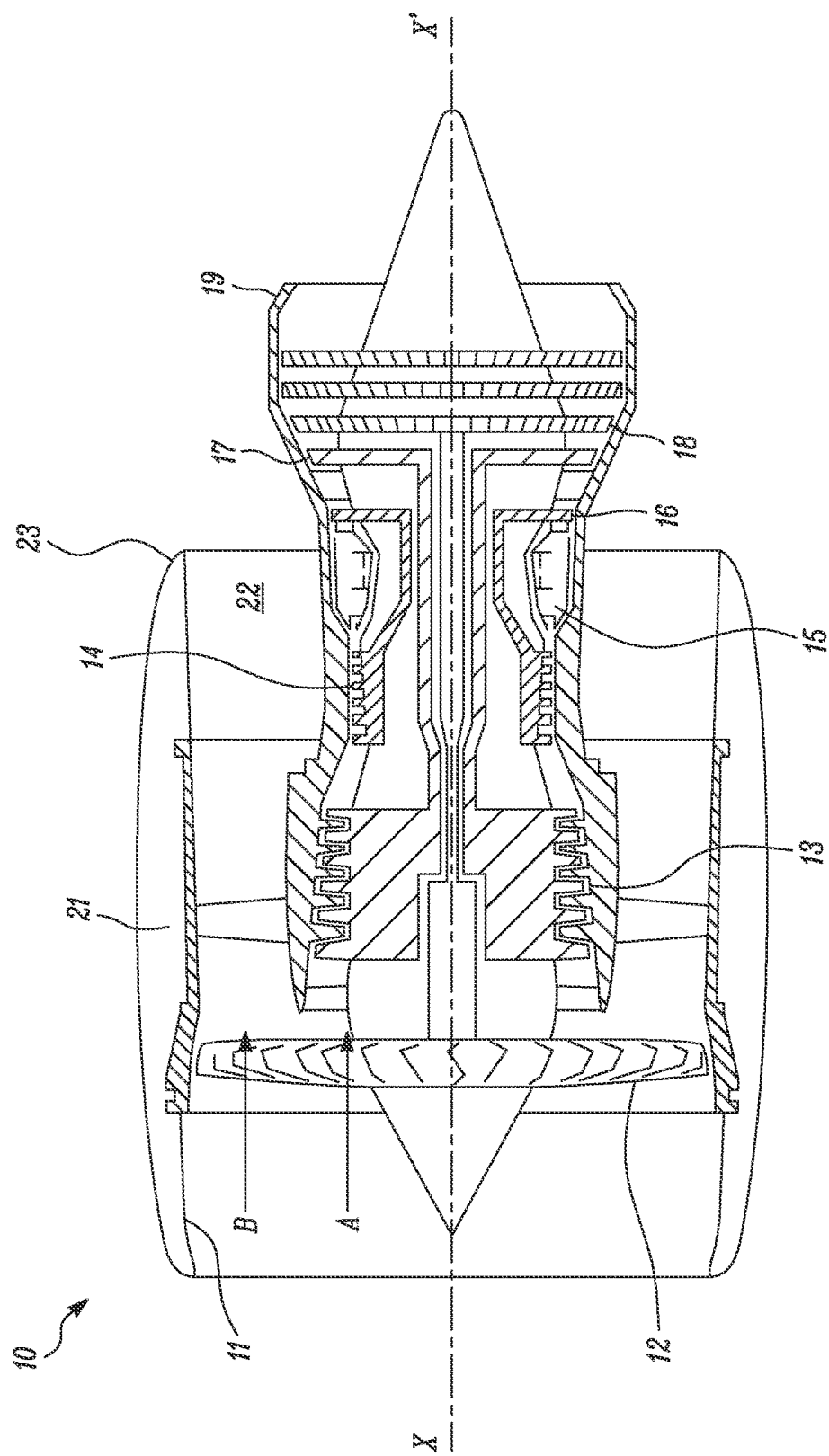
FIG. 1 is a sectional side view of a gas turbine engine.

FIG. 1 shows a ducted fan gas turbine engine 10 having a principal rotational axis X-X'.

The gas turbine engine 10 includes, in axial flow series, an intake 11, a fan 12, an intermediate pressure compressor 13, a high pressure compressor 14, combustion equipment 15, a high pressure turbine 16, an intermediate pressure turbine 17, a low pressure turbine 18, and an engine core exhaust nozzle 19. A nacelle 21 generally surrounds the gas turbine engine 10 and defines the intake 11, a bypass duct 22, and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate, and low pressure turbines 16, 17, 18 before being exhausted through the engine core exhaust nozzle 19 to provide additional propulsive thrust. The high, intermediate, and low pressure turbines 16, 17, 18 respectively drive the high and intermediate pressure compressors 14, 13 and the fan 12 by suitable interconnecting shafts.

Figure 2A:
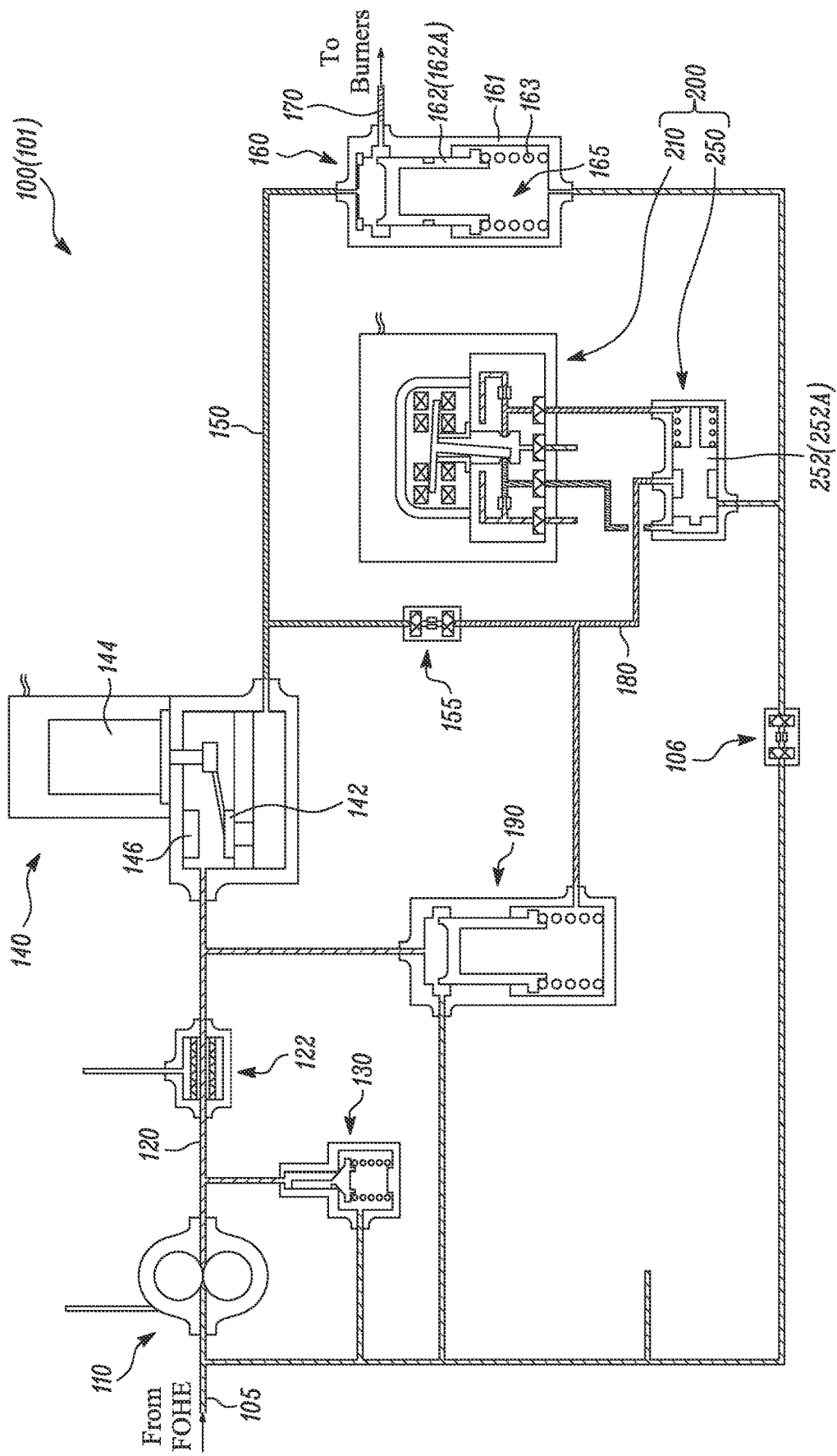
FIG. 2A is a schematic diagram of a fuel control system operating in a first mode according to an embodiment of the present disclosure.
Figure 2B:
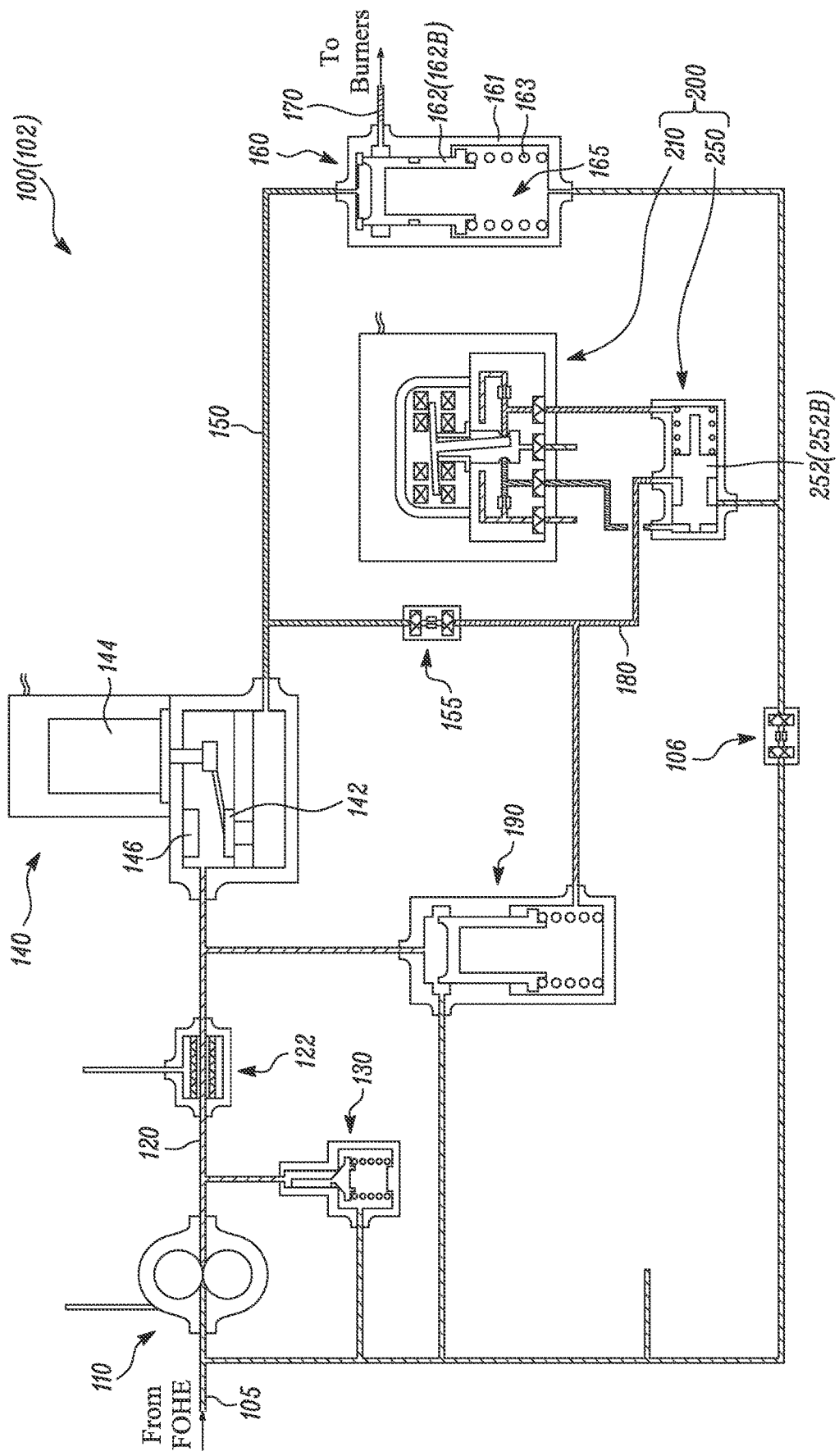
FIG. 2B is a schematic diagram of the fuel control system operating in a second mode according to an embodiment of the present disclosure.

FIGS. 2A and 2B show a fuel control system 100 for a gas turbine engine according to an embodiment of the present disclosure. The fuel control system 100 may be used in, for example, a turbofan engine (e.g., the gas turbine engine 10 of FIG. 1), a turboshaft engine, a turboprop engine, and the like.

The fuel control system 100 may be selectively operable in a first mode 101 (shown in FIG. 2A) and a second mode 102 (shown in FIG. 2B), The first mode 101 may correspond to a run state of the gas turbine engine and the second mode 102 may correspond to a shutdown state of the gas turbine engine.

Different hydraulic lines are indicated by corresponding cross-hatchings in FIGS. 2A and 2B.

Referring to FIGS. 2A and 2B, the fuel control system 100 may include a pump 110 that receives a fuel drawn from a fuel tank (not shown). The fuel may be drawn from the fuel tank and supplied to the pump 110 by a suitable low pressure pump (e.g., a centrifugal impeller pump) via a low pressure line 105. In some examples, prior to being received by the pump 110, the fuel may be used to cool an engine lubrication oil in a fuel oil heat exchanger (FOHE).

The pump 110 may be fluidly configured to provide a high pressure fuel flow to a supply line 120. Specifically, the pump 110 may receive the fuel via the low pressure line 105, pressurize the fuel, and provide the high pressure fuel flow to the supply line 120.

The pump 110 may include a variable displacement pump, such as a vane pump, a gear pump (e.g., a twin pinion gear pump), a piston pump, or any other suitable fixed or variable displacement pump, based on application requirements.

The fuel control system 100 may further include a flow washed filter 122 provided in the supply line 120. The high pressure fuel flow provided by the pump 110 may be supplied to various components of the fuel control system 100 via the flow washed filter 122 for various actuation functions (e.g., for servo-valve offtake flows).

The fuel control system 100 may further include a pressure relief valve 130 fluidly connected to the low pressure line 105 and the supply line 120. The pressure relief valve 130 may prevent excess pressure build up in the supply line 120 in an event of a downstream blockage (e.g., a blockage caused by coking of the fuel in an engine fuel manifold).

The fuel control system 100 further includes a fuel metering valve 140. The fuel metering valve 140 includes a valve body 142 configured to adjust a flow of the fuel between the supply line 120 and a delivery line 150.

The fuel metering valve 140 further includes a valve actuating unit 144 configured to move the valve body 142. The valve actuating unit 144 is electrically powered. In other words, the valve actuating unit 144 requires electrical power to operate.

The valve actuating unit 144 may include an electric motor operatively coupled to the valve body 142. In some examples, the electric motor may be a stepper motor. The stepper motor may employ step counting for position measurement of the valve body 142. In some examples, the fuel metering valve 140 may be a rotary valve. In such examples, the fuel metering valve 140 may include a housing and a fixed orifice plate positioned stationarily in the housing and defining a fixed orifice. Moreover, in such examples, the valve body 142 may include a rotatable orifice plate positioned next to the fixed orifice plate and defining a rotatable orifice. The valve actuating unit 144 may rotate the valve body 142 (i.e., the rotatable orifice plate) relative to the housing and the fixed orifice plate to adjust the flow of the fuel between the supply line 120 and the delivery line 150. As a result, the fuel metering valve 140 may have a simple and lightweight design.

The fuel metering valve 140 further includes a valve detent 146 configured to retain the valve body 142 in a current body position of the valve body 142 upon loss of electrical power to the valve actuating unit 144. In some cases, the current body position of the valve body 142 may be a nearest detent position. In other words, the valve detent 146 may be configured to retain the valve body 142 in the nearest detent position that is substantially proximal to a position the valve body 142 was at prior to loss of electrical power to the valve actuating unit 144. The valve detent 146 may include a magnetic detent. The magnetic detent may magnetically retain the valve body 142 in the current body position of the valve body 142. Therefore, during operation, the fuel metering valve 140 may continue the flow of the fuel to the delivery line 150 upon loss of electrical power to the valve actuating unit 144 due to the valve detent 146.

The fuel control system 100 further includes a pressure raising and shut-off valve (PRSOV) 160 fluidly connected to the delivery line 150. The PRSOV 160 includes a valve member 162 movable between an open position 162A (shown in FIG. 2A) and a closed position 162B (shown in FIG. 2B).

In the open position 162A, the valve member 162 allows the flow of the fuel from the delivery line 150 to an engine line 170 that is in fluid communication with one or more burners of the gas turbine engine (e.g., burners of the combustion equipment 15 of the gas turbine engine 10 of FIG. 1). For example, in the open position 162A, the valve member 162 may not cover a port that allows the flow of the fuel from the delivery line 150 to the engine line 170. Therefore, the gas turbine engine may be in the run state when the valve member 162 is in the open position 162A.

In the closed position 162B, the valve member 162 prevents the flow of the fuel from the delivery line 150 to the engine line 170. For example, in the closed position 162B, the valve member 162 may cover the port that allows the flow of the fuel from the delivery line 150 to the engine line 170 in order to prevent the flow of the fuel from the delivery line 150 to the engine line 170. In the closed position 162B, the valve member 162 may further engage a seal to ensure that the fuel does not flow from the delivery line 150 to the engine line 170.

Therefore, the gas turbine engine may be in the shutdown state when the valve member 162 is in the closed position 162B.

The PRSOV 160 may further include a housing 161. The valve member 162 may be at least partially disposed within the housing 161. The PRSOV 160 may further include a biasing element 163 configured to bias the valve member 162 towards the closed position 162B (shown in FIG. 2B). The PRSOV 160 may further include a sleeve (e.g., a cylindrical sleeve) (not shown) disposed within the housing 161 and at least partially receiving the valve member 162 therein. The PRSOV 160 may further include one or more elastomeric seals (not shown) disposed between the housing 161 and an outer surface of the sleeve to provide a seal therebetween.

The valve member 162 and the housing 161 may define a control chamber 165. In some examples, the biasing element 163 may be disposed within the control chamber 165. For example, the biasing element 163 may engage each of the housing 161 and the valve member 162 to bias the valve member 162 towards the closed position 162B. The biasing element 163 may include a spring or other suitable resilient elements, based on application requirements. A pressure of the fuel received in the control chamber 165 may assist the biasing element 163 in biasing the valve member 162 towards the closed position 162B.

The fuel control system 100 further includes a shutoff effector 200. The shutoff effector 200 includes a first stage unit 210 and a second stage unit 250.

The first stage unit 210 is electrically powered. In some examples, the first stage unit 210 may include a four-way proportional servo-valve. In some other examples, the first stage unit 210 may include a solenoid valve. Further, the second stage unit 250 is fluidly connected to the PRSOV 160 and controlled by the first stage unit 210. The first stage unit 210 may hydraulically control the second stage unit 250.

The second stage unit 250 is configured to actuate the valve member 162 of the PRSOV 160. The second stage unit 250 may hydraulically actuate the valve member 162 of the PRSOV 160. For example, the second stage unit 250 may provide pressurized fuel to the control chamber 165 to actuate the valve member 162 of the PRSOV 160. The second stage unit 250 includes a spool 252 movable between a first spool position 252A (shown in FIG. 2A) and a second spool position 252B (shown in FIG. 2B).

In the first spool position 252A of the spool 252, the valve member 162 of the PRSOV 160 is in the open position 162A. Consequently, the gas turbine engine may be in the run state when the spool 252 is in the first spool position 252A. In the second spool position 252B of the spool 252, the valve member 162 of the PRSOV 160 is in the closed position 162B. Consequently, the gas turbine engine may be in the shutdown state when the spool 252 is in the second spool position 252B.

The first stage unit 210 of the shutoff effector 200 can be configured for one of; a fail-down application (e.g., for fixed wing aircrafts), where the flow of the fuel to the one or more burners of the gas turbine engine is required to decrease (fail downwards) when electrical power is lost; and a fail-fixed application (e.g., for rotorcrafts, tiltrotors, etc.), where the flow of the fuel to the one or more burners of the gas turbine engine is required to remain constant when electrical power is lost. In other words, the first stage unit 210 can be configured to decrease the flow of the fuel or to maintain the flow of the fuel from the delivery line 150 to the engine line 170 when electrical power to the first stage unit 210 is lost.

Figure 3:
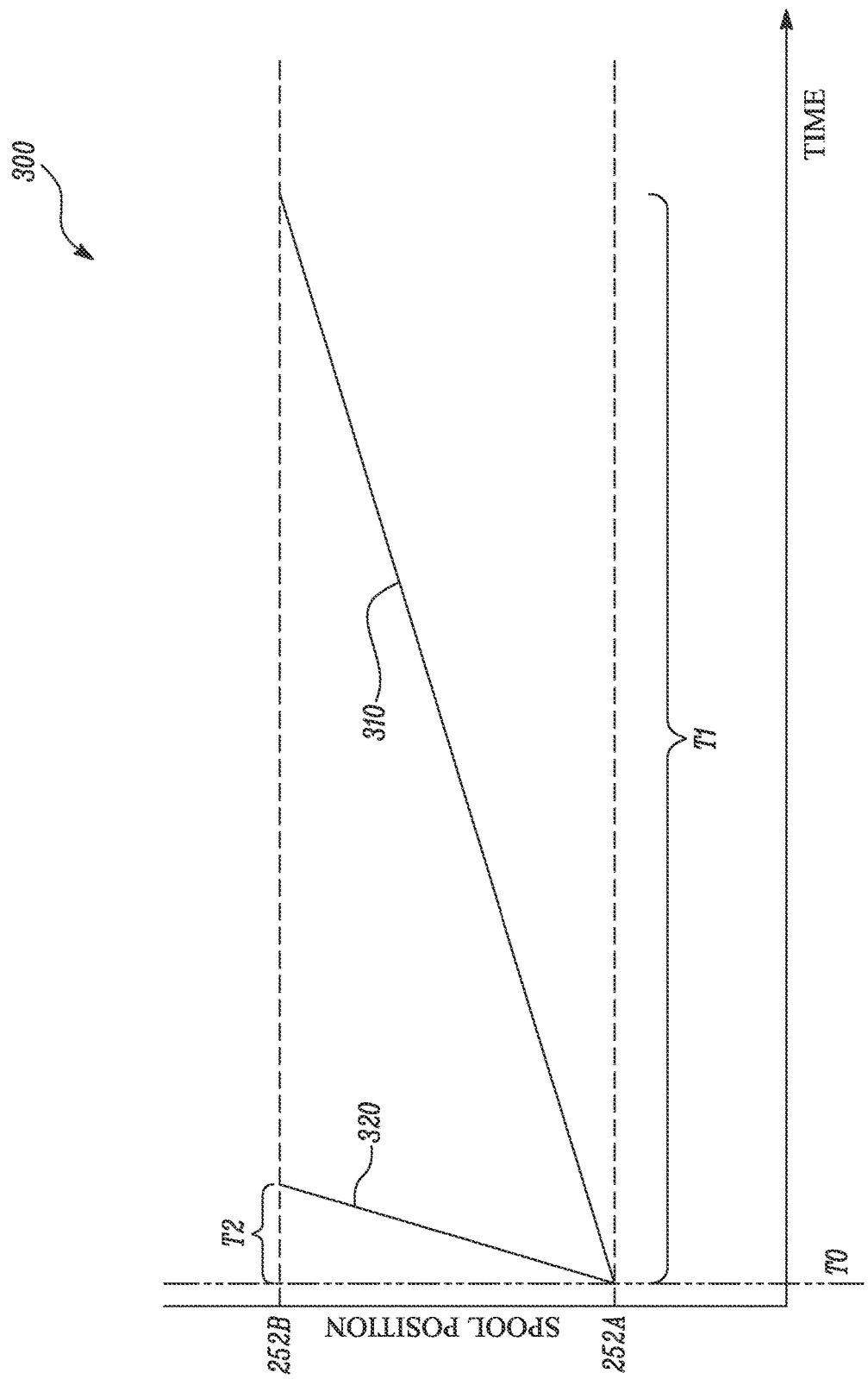
FIG. 3 is a graph illustrating different movements of a spool of the fuel control system between two positions with respect to time according to an embodiment of the present disclosure.

FIG. 3 shows a graph 300 illustrating different movements (change in a spool position) of the spool 252. Referring to FIGS. 2A, 2B, and 3, for the fail-down application, upon loss of electrical power (e.g., at a time instance T0 in FIG.

3) to the first stage unit 210 when the spool 252 is in the first spool position 252A (corresponding to the run state of the gas turbine engine), the first stage unit 210 is configured to control the second stage unit 250 to move the spool 252 to the second spool position 252B (corresponding to the shutdown state of the gas turbine engine) over a predetermined time duration T1 from loss of electrical power to the first stage unit 210 (depicted by a first curve 310 in FIG. 3), such that the valve member 162 of the PRSOV 160 moves to the closed position 162B after the predetermined time duration T1 and allows the flow of the fuel from the delivery line 150 to the engine line 170 during the predetermined time duration T1.

As shown in FIG. 3, after the predetermined time duration T1, the spool 252 is at the second spool position 252B. As a result, after the predetermined time duration T1, the valve member 162 of the PRSOV 160 is at the closed position 182E to prevent the flow of the fuel from the delivery line 150 to the engine line 170.

The first stage unit 210 and the second stage unit 250 may be configured such that the predetermined time duration T1 is at least greater than a duration of a transient loss of electrical power to the first stage unit 210. Such transient loss of electrical power may occur due to, for example, switching of a power source (e.g., ground cart, battery, onboard generators, etc.) for an airframe power bus or reset of the airframe power bus due to a consumer fault. The predetermined time duration T1 may be greater than or equal to 100 milliseconds (ms). In some cases, the predetermined time duration T1 may be greater than 100 ms, greater than 110 ms, greater than 120 ms, greater than 130 ms, greater than 140 ms, or greater than 150 ms Therefore, when configured for the fail-down configuration, the fuel control system 100 may prevent an undesired perturbation in thrust produced by the gas turbine engine during the transient loss of electrical power to the first stage unit 210.

For the fail-fixed application, upon loss of electrical power to the first stage unit 210 when the spool 252 is in the first spool position 252A (corresponding to the run state of the gas turbine engine), the first stage unit 210 is configured to control the second stage unit 250 to retain the spool 252 in the first spool position 252A, such that the valve member 162 of the PRSOV 160 is retained in the open position 162A. As a result, the fuel may continue to flow from the delivery line 150 to the engine line 170 upon loss of electrical power to the first stage unit 210.

The shutoff effector 200 and operation thereof will be further described in detail with reference to FIGS. 4A and 4B.

Figure 4A:
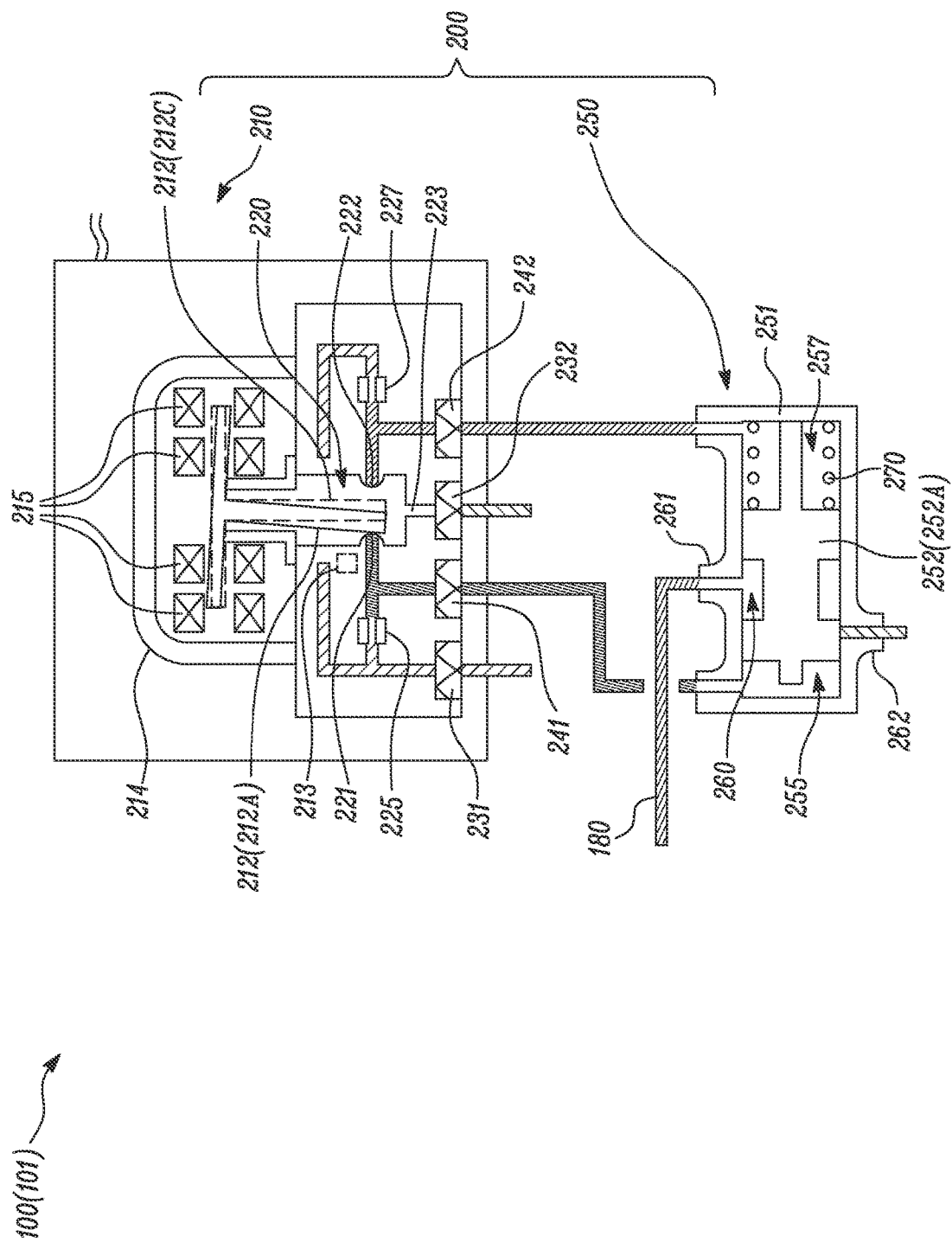
FIG. 4A is a detailed schematic diagram of a shutoff effector of the fuel control system with the fuel control system operating in the first mode according to an embodiment of the present disclosure.
Figure 4B:
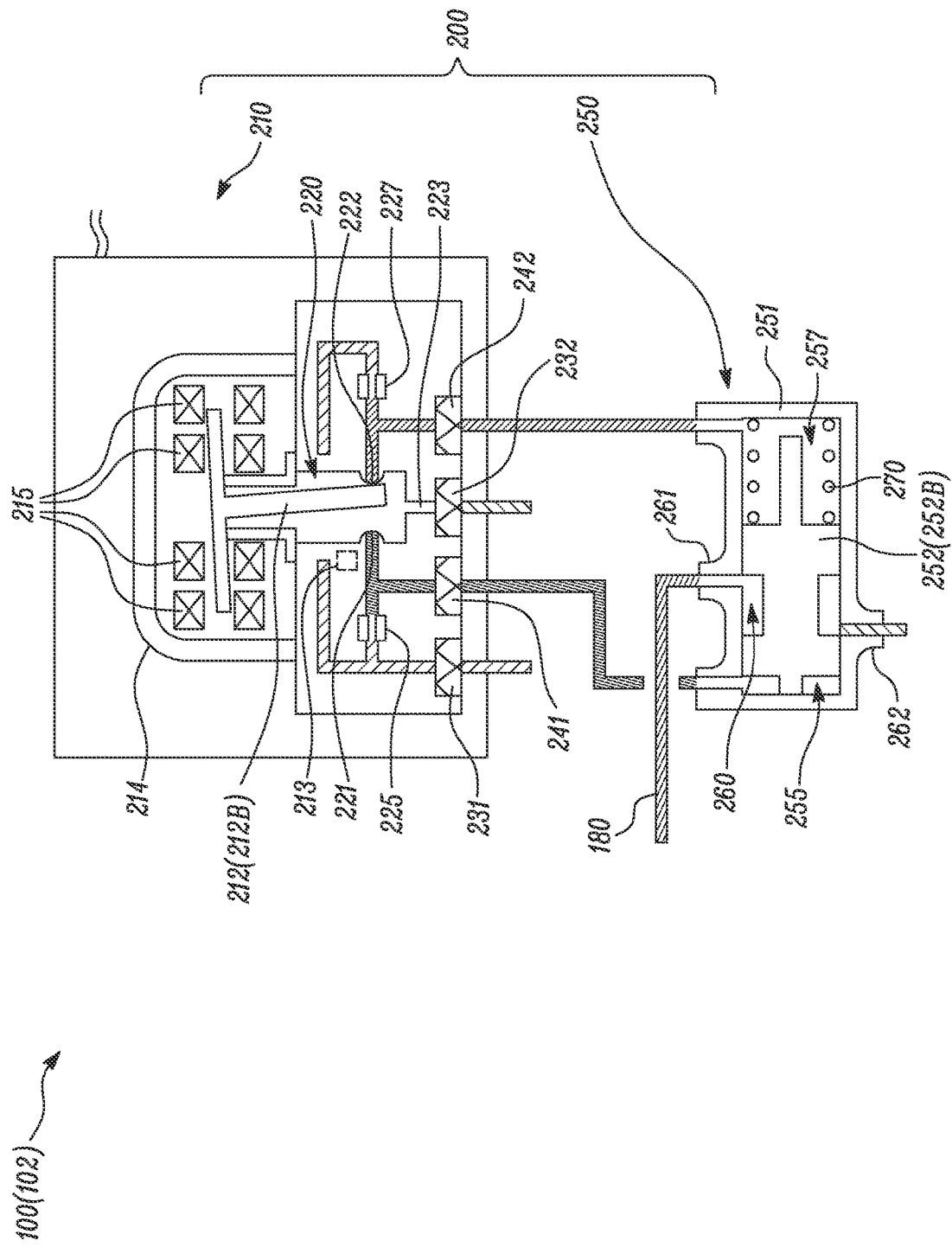
FIG. 4B is a detailed schematic diagram of the shutoff effector of the fuel control system with the fuel control system operating in the second mode according to an embodiment of the present disclosure.

FIGS. 4A and 4B show the fuel control system 100 with some components of the fuel control system 100 not shown for illustrative purposes. Specifically, FIGS. 4A and 4B show detailed views of the shutoff effector 200 of the fuel control system 100 with the fuel control system 100 in the first and second modes 101, 102. The fuel control system 100 is in the first mode 101 in FIG. 4A and in the second mode 102 in FIG. 4B.

Referring to FIGS. 4A and 4B, the first stage unit 210 may include a movable member 212 movable at least between a first end position 212A (shown in FIG. 4A) and a second end position 212B (shown in FIG. 4B). The first end position 212A may correspond to the first spool position 252A of the spool 252 of the second stage unit 250 and the second end position 212B may correspond to the second spool position 252B of the spool 252 of the second stage unit 250. Specifically, in the first end position 212A of the movable member 212, the first stage unit 210 may control the second stage unit 250 to move the spool 252 to the first spool position 252A. Further, in the second end position 212E of the movable member 212, the first stage unit 210 may control the second stage unit 250 to move the spool 252 to the second spool position 252B.

The first stage unit 210 may further include a stage actuating unit 214 configured to actuate the movable member 212 between the first end position 212A and the second end position 212B. The stage actuating unit 214 may be electrically powered, such that loss of electrical power to the first stage unit 210 corresponds to loss of electrical power to the stage actuating unit 214.

The stage actuating unit 214 may include one or more coils 215 that are electrically powered. The one or more coils 215 may actuate the movable member 212. For example, the one or more coils 215 may provide magnetic torque on the movable member 212 to actuate the movable member 212 between the first end position 212A and the second end position 212B.

The one or more cons 215 may actuate the movable member 212 to the first end position 212A when the one or more coils 215 are energized to a first current level (for example, 50 milliamperes). The one or more coils 215 may actuate the movable member 212 to the second end position 212B when the one or more coils 215 are energized to a second current level (for example, −50 milliamperes) different from the first current level Loss of electrical power to the stage actuating unit 214 may cause a zero current level (for example, 0 milliamperes) in the one or more coils 215.

The first stage unit 210 may further include a fluid chamber 220 at least partially receiving the movable member 212 therein. The first stage unit 210 may further include a first chamber port 221 fluidly communicating with the fluid chamber 220 and a second chamber port 222 fluidly communicating with the fluid chamber 220. The movable member 212 may be configured to close the first chamber port 221 in the first end position 212A and to close the second chamber port 222 in the second end position 212B. The first stage unit 210 may further include a third chamber port 223 fluidly communicating with the fluid chamber 220. The third chamber port 223 may be open irrespective of a position of the movable member 212. In other words, the movable member 212 may not close the third chamber port 223 regardless of its position.

The first stage unit 210 may further include a first input port 231 configured to receive the high pressure fuel flow from the supply line 120 (e.g., from the flow washed filter 122 shown in FIGS. 2A and 2B) and fluidly connected with each of the first chamber port 221 and the second chamber port 222. The first input port 231 may be fluidly connected with each of the first chamber port 221 and the second chamber port 222 via suitable fuel lines. The first stage unit 210 may further include a second input port 232 configured to receive a low pressure fuel flow from the low pressure line 105 and fluidly connected to the third chamber port 223.

The first stage unit 210 may further include a first orifice 225 fluidly disposed between the first input port 231 and the first chamber port 221 and a second orifice 227 fluidly disposed between the first input port 231 and the second chamber port 222. The first orifice 225 may be configured to reduce a pressure of the fuel flowing to the fluid chamber 220 via the first input port 231. Further, the second orifice 227 may be configured to reduce a pressure of the fuel flowing to the fluid chamber 220 via the second chamber port 222.

The first stage unit 210 may further include a first output port 241 fluidly connected to the first chamber port 221 and a second output port 242 fluidly connected to the second chamber port 222. The first stage unit 210 may hydraulically control the second stage unit 250 via the first output port 241 and the second output port 242.

The second stage unit 250 may include a housing 251 movably receiving the spool 252 therein. In some examples, the second stage unit 250 may further include a sleeve (e.g., a cylindrical sleeve) (not shown) disposed within the housing 251 and receiving the spool 252 therein. The second stage unit 250 may further include one or more elastomeric seals (not shown) disposed between the housing 251 and an outer surface of the sleeve to provide a seal therebetween, and to prevent leakage of different fuel pressures stacked axially along a length of the spool 252.

The housing 251 and the spool 252 may define a first end chamber 255 fluidly connected to the first output port 241 of the first stage unit 210 and a second end chamber 257 fluidly connected to the second output port 242 of the first stage unit 210. The first and second end chambers 255, 257 may be disposed on opposing sides of the spool 252. The second stage unit 250 may further include a biasing member 270 received within the second end chamber 257 and configured to bias the spool 252 towards the second spool position 2523. The biasing member 270 may include, for example, a spring.

The first end chamber 255 may receive the fuel via the first output port 241 of the first stage unit 210 and the second end chamber 257 may receive the fuel via the second output port 242 of the first stage unit 210. A pressure differential of the fuel received by the first and second end chambers 255, 257 may move the spool 252 between the first spool position 252A and the second spool position 252B. Specifically, in the first end position 212A of the movable member 212, a fluid pressure within the first end chamber 255 may be higher than a fluid pressure within the second end chamber 257, such that the spool 252 is in the first spool position 252A against a biasing of the biasing member 270. In the second end position 212B of the movable member 212, the fluid pressure within the first end chamber 255 may be less than or equal to the fluid pressure within the second end chamber 257, such that the spool 252 is in the second spool position 252B.

The housing 251 may further include a first port 261 fluidly connected to an intermediate pressure line 180 (also shown in FIGS. 2A and 2B) and a second port 262 fluidly connected to the PRSOV 160 (shown in FIGS. 2A and 2B). The housing 251 and the spool 252 may further define an annular chamber 260 disposed between the first and second end chambers 255, 257 and disposed in fluid communication with the first port 261. The spool 252 may fluidly separate the first end chamber 255, the second end chamber 257, and the annular chamber 260 from each other.

In the first spool position 252A, the spool 252 may fluidly separate the second port 262 from the annular chamber 260, such that the second port 262 is fluidly disconnected from the first port 261. In the second spool position 2528, the spool 252 may fluidly connect the second port 262 to the annular chamber 260, such that the second port 262 is fluidly connected with the first port 261 via the annular chamber 260.

When the first stage unit 210 is configured for the fail-down application, upon loss of electrical power to the stage actuating unit 214, the movable member 212 may move to a neutral position 212C (shown as dashed lines in FIG. 4A) between the first end position 212A and the second end position 2128. Specifically, upon loss of electrical power to the stage actuating unit 214, the movable member 212 may move to the neutral position 212C between the first end position 212A and the second end position 212B, such that each of the first and second chamber ports 221, 222 is open. Moreover, upon loss of electrical power to the stage actuating unit 214 when the movable member is in the first end position 212A, the movable member 212 may move to the neutral position 212C from the first end position 212A.

Referring to FIGS. 2A to 4B, upon a movement of the movable member 212 from the first end position 212A to the neutral position 212C, the spool 252 of the second stage unit 250 may move to the second spool position 2528 over the predetermined time duration T1 (depicted by the first curve 310 in FIG. 3) and the valve member 162 of the PRSOV 160 may move to the closed position 162B after the predetermined time duration T1. Specifically, upon the movement of the movable member 212 from the first end position 212A to the neutral position 212C, the fluid pressure within the first end chamber 255 may tend to equalize with the fluid pressure within the second end chamber 257, such that the spool 252 of the second stage unit 250 moves to the second spool position 2523 over the predetermined time duration T1 and the valve member 162 of the PRSOV 160 moves to the closed position 1623 after the predetermined time duration T1. The spool 252 may move to the second spool position 252B over the predetermined time duration T1 when the fluid pressure within the first end chamber 255 tends to equalize with the fluid pressure within the second end chamber 257 due to the biasing of the biasing member 270. Therefore, when configured for the fail-down application, the first stage unit 210 may control the second stage unit 250, and the second stage unit 250 may control the PRSOV 160 to decrease the flow of the fuel (for example, decrease to zero after the predetermined time duration T1) to the engine line 170 upon loss of electrical power to the stage actuating unit 214. It may be noted that the valve member 162 may not be affected by movement of the spool 252 from the first position 252A towards the second position 252B until the spool 252 fluidly connects the second port 262 with the first port 261 via the annular chamber 260, As a result, a commencement of reduction in the flow of the fuel to the engine line 170 may be delayed due to a slow movement of the spool 252 from the first spool position 252A to the second spool position 252B.

When the first stage unit 210 is configured for the fail-fixed application, the first stage unit 210 may further include a latch member 213 operatively coupled to the movable member 212.

The latch member 213 is shown by a dashed square in FIGS. 4A and 4B for illustrative purpose only. In the fail-fixed application, the latch member 213 may be configured to provide a greater magnetic force to the movable member 212 than a centring force applied by the moveable member 212 to overcome the centring force and to retain the latch member 213 in the first end position 212A. The centring force may be applied from bending of a thin tube on which the moveable member 212 may be mounted, or torsions springs coupled to the moveable member 212. In the fail-down application, the latch member 213 may be configured to provide a weaker magnetic force to the movable member 212 than the centring force.

The latch member 213 may be a detent (e.g., a magnetic detent) configured to retain the movable member 212 in the first end position 212A. Specifically, upon loss of electrical power to the stage actuating unit 214 when the movable member 212 is in the first end position 212A, the latch member 213 may retain the movable member 212 in the first end position 212A, such that the spool 252 is retained in the first spool position 252A and the valve member 162 of the PRSOV 160 is retained in the open position 162A. Therefore, when configured for the fail-fixed application, the first stage unit 210 may control the second stage unit 250, and the second stage unit 250 may control the PRSOV 160 to allow a continuous flow of the fuel to the engine line 170 upon loss of electrical power to the stage actuating unit 214.

For both the fail-fixed application and the fail-down application, it may be important for the fuel control system 100 to be able to shut off flow in a short period of time, for example, to prevent overspeed of the gas turbine engine. Upon the movement of the movable member 212 from the first end position 212A to the second end position 212B (for example, at the time instance T0 in FIG. 3), the spool 252 may move from the first spool position 252A to the second spool position 252E within a shutdown time duration T2 (depicted by a second curve 320 in FIG. 3) and the valve member 162 of the PRSOV 160 may move from the open position 162A to the closed position 1623 within the shutdown time duration T2.

It may be noted that the shutdown time duration T2 may need to be substantially less than the predetermined time duration T1 in order to rapidly bring the gas turbine engine to the shutdown state. The shutdown time duration T2 may be less than the predetermined time duration T1 by a factor of at least 10. In other words, the predetermined time duration T1 may be greater than the shutdown time duration T2 by a factor of at least 10. For example, if the predetermined time duration T1 is 100 milliseconds, the shutdown time duration T2 may be less than 10 milliseconds. This may ensure that the gas turbine engine rapidly enters the shutdown state when required. Therefore, the fuel control system 100 may prevent shutoff of fuel flow when electrical power is transiently lost for the fail-down application while allowing rapid shutoff to manage potential engine overspeed conditions.

The fuel control system 100 may further include a pull-down orifice 155 (shown in FIGS. 2A and 2B) fluidly disposed between the delivery line 150 and the intermediate pressure line 180, such that the pull-down orifice 155 is fluidly connected to the first port 261 via the intermediate pressure line 180. The pull-down orifice 155 may be configured to reduce a pressure of the fuel flowing from the delivery line 150 to the intermediate pressure line 180.

The fuel control system 100 may further include a back-pressure orifice 106 (shown in FIGS. 2A and 2B) fluidly connected to the second port 262 of the second stage unit 250. The back-pressure orifice 106 may facilitate the actuation of the valve member 162 of the PRSOV 160 by the second stage unit 250.

The fuel control system 100 may further include a spill valve 190 (shown in FIGS. 2A and 2B) fluidly connected to the intermediate pressure line 180. The spill valve 190 may further be fluidly connected the low pressure line 105 and the supply line 120. The spill valve 190 may be configured to control a fuel flow between the supply line 120 and the pump 110 based on a fluid pressure in the intermediate pressure line 180. When the valve member 162 of the PRSOV 160 moves to the closed position 1623, the spill valve 190 may reduce a pressure differential drop across the pump 110. This may reduce a load on bearings of the pump 110 and ensure that the bearings do not get damaged when the valve member 162 of the PRSOV 160 moves to the closed position 162B.

The fuel control system 100, as described above, may permit respective configurations of the first stage unit 210 for the fan-down application and the fail-fixed application to have a common hydraulic and mechanical interface. As a result, the fuel control system 100 may be accommodated in a common fuel control housing, i.e., the fuel control system 100 may not require a change in the fuel control housing to accommodate the respective configurations of the first stage unit 210 for the fail-down application and the fail-fixed application. Therefore, the fuel control system 100 may allow a single design of the fuel control housing to be used with the common hydraulic and mechanical interface for both the fail-fixed application and the fail-down application, thereby eliminating a need to use complex adapters to switch the fuel control system 100 between the fail-fixed application and the fail-down application.

Moreover, in one example, incorporating the latch member 213 in the first stage unit 210 may switch the fuel control system 100 from the fail-down application to the fail-fixed application while other components of the fuel control system 100 and configurations thereof remain the same. Moreover, removing the latch member 213 from the first stage unit 210 may switch the fuel control system 100 from the fail-fixed application to the fail-down application.

The second stage unit 250 of the shutoff effector 200 with a porting as described above with reference to FIGS. 4A and 4B may be suitable for small gas turbine engines that produce thrust ranging from about 8.9 kilonewton (kN) (about 2 kilo pound-force (klbf)) to about 40 kN (about 9 klbf) and/or shaft power outputs in a range of about 2000 horsepower to about 6000 horsepower.

Medium gas turbine engines that produce thrust ranging from about 66.7 kN (about 15 klbf) to about 80 kN (about 18 klbf), and large gas turbine engines that produce thrust ranging from about 284.6 kN (about 64 klbf) to about 431.5 kN (about 97 klbf) may require a more complex porting in the second stage unit 250. However, an overall effect of the shutoff effector 200 with the more complex porting in the second stage unit 250 is similar to what is described above.

Figure 5:
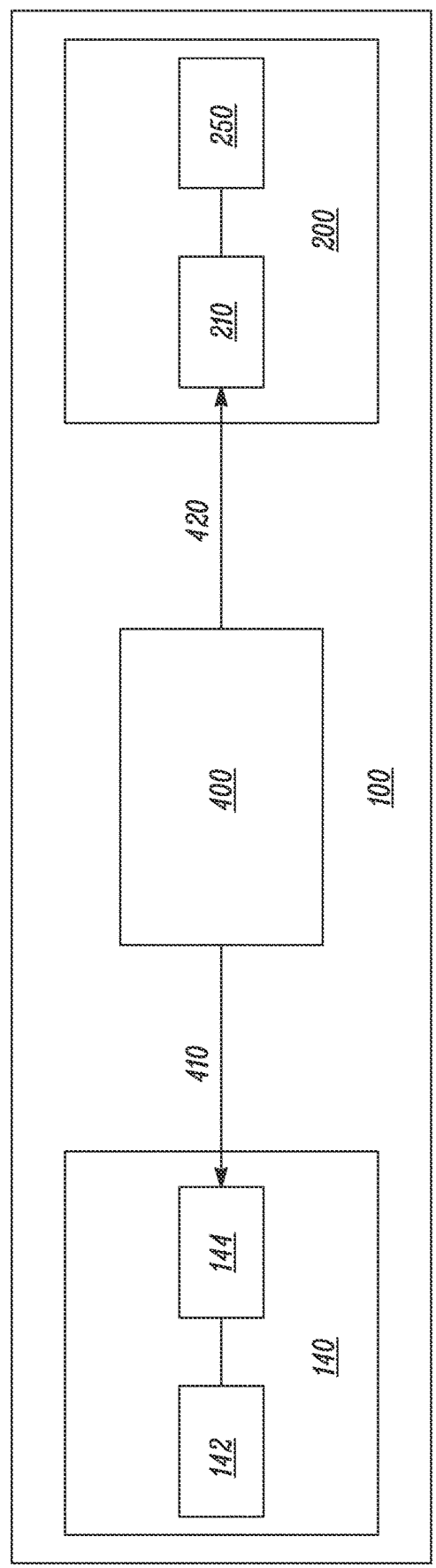
FIG. 5 is a schematic block diagram of the fuel control system with some components of the fuel control system not shown according to an embodiment of the present disclosure.

FIG. 5 shows a block diagram of the fuel control system 100 with some components of the fuel control system 100 not shown for illustrative purposes.

As shown in FIG. 5, the fuel control system 100 may further include a controller 400 configured to control at least the valve actuating unit 144 of the fuel metering valve 140 and the first stage unit 210 of the shutoff effector 200.

The controller 400 may provide one or more metering signals 410 to the valve actuating unit 144, for example, to move the valve body 142. In some examples, the controller 400 may further provide electrical power to the valve actuating unit 144. For example, the controller 400 may provide electrical power to the valve actuating unit 144 from a power source. The power source may be, for example, an electrical generator driven by the gas turbine engine, an external power source such as a battery, and the like.

Moreover, the controller 400 may provide one or more effector signals 420 to the first stage unit 210, for example, to control the second stage unit 250. Specifically, the one or more effector signals 420 may energise the one or more coils 250 in order to actuate the movable member 212 (shown in FIGS. 4A and 4B). The controller 400 and the first stage unit 210 may form a closed loop control system. In some examples, the controller 400 may further provide electrical power to the first stage unit 210.

The controller 400 may include, for example, an electronic engine controller (EEC), an engine control unit (ECU), an engine monitoring unit (EMU), and the like.

In some examples, the gas turbine engine 10 (shown in FIG. 1) is for an aircraft. Further, in some examples, the gas turbine engine 10 includes the fuel control system 100.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A fuel control system for a gas turbine engine, the fuel control system comprising:
a fuel metering valve comprising:
a valve body configured to adjust a flow of a fuel between a supply line and a delivery line;
a valve actuating unit configured to move the valve body, wherein the valve actuating unit is electrically powered; and
a valve detent configured to retain the valve body in a current body position of the valve body upon loss of electrical power to the valve actuating unit;
a pressure raising and shut-off valve (PRSOV) fluidly connected to the delivery line and comprising a valve member movable between an open position and a closed position, wherein, in the open position, the valve member allows the flow of the fuel from the delivery line to an engine line that is in fluid communication with one or more burners of the gas turbine engine and wherein, in the closed position, the valve member prevents the flow of the fuel from the delivery line to the engine line; and
a shutoff effector comprising:
a first stage unit that is electrically powered; and
a second stage unit fluidly connected to the PRSOV and controlled by the first stage unit, wherein the second stage unit is configured to actuate the valve member of the PRSOV, the second stage unit comprising a spool movable between a first spool position and a second spool position, wherein, in the first spool position of the spool, the valve member of the PRSOV is in the open position, and wherein, in the second spool position of the spool, the valve member of the PRSOV is in the closed position;
wherein, upon loss of electrical power to the first stage unit when the spool is in the first spool position, the first stage unit is configured to:
control the second stage unit to move the spool to the second spool position over a predetermined time duration from loss of electrical power to the first stage unit, such that the valve member of the PRSOV moves to the closed position after the predetermined time duration and allows the flow of the fuel from the delivery line to the engine line during the predetermined time duration, wherein, after the predetermined time duration, the valve member of the PRSOV is at the closed position to prevent the flow of the fuel from the delivery line to the engine line; or
control the second stage unit to retain the spool in the first spool position, such that the valve member of the PRSOV is retained in the open position;
wherein the first stage unit comprises:
a movable member movable at least between a first end position corresponding to the first spool position of the spool of the second stage unit and a second end position corresponding to the second spool position of the spool of the second stage unit; and
a stage actuating unit configured to actuate the movable member between the first end position and the second end position, wherein the stage actuating unit is electrically powered, such that loss of electrical power to the first stage unit corresponds to loss of electrical power to the stage actuating unit, wherein, in the first end position of the movable member, the first stage unit controls the second stage unit to move the spool to the first spool position, and, in the second end position of the movable member, the first stage unit controls the second stage unit to move the spool to the second spool position; and
a latch member operatively coupled to the movable member, wherein, upon loss of electrical power to the stage actuating unit when the movable member is in the first end position, the latch member retains the movable member in the first end position, such that the spool is retained in the first spool position and the valve member of the PRSOV is retained in the open position.

2. The fuel control system of claim 1, wherein the predetermined time duration is greater than or equal to 100 milliseconds.

3. The fuel control system of claim 1, wherein the valve actuating unit comprises an electric motor operatively coupled to the valve body.

4. The fuel control system of claim 1, wherein the valve detent comprises a magnetic detent.

5. The fuel control system of claim 1, wherein, upon loss of electrical power to the stage actuating unit, the movable member moves to a neutral position between the first end position and the second end position, wherein, upon loss of electrical power to the stage actuating unit when the movable member is in the first end position, the movable member moves to the neutral position, and wherein, upon a movement of the movable member from the first end position to the neutral position, the spool of the second stage unit moves to the second spool position over the predetermined time duration and the valve member of the PRSOV moves to the closed position after the predetermined time duration.

6. The fuel control system of claim 1, wherein, upon the movement of the movable member from the first end position to the second end position, the spool moves from the first spool position to the second spool position within a shutdown time duration and the valve member of the PRSOV moves from the open position to the closed position within the shutdown time duration, and wherein the predetermined time duration is greater than the shutdown time duration by a factor of at least 10.

7. The fuel control system of claim 1, wherein the first stage unit further comprises:
a fluid chamber at least partially receiving the movable member therein;
a first chamber port fluidly communicating with the fluid chamber, wherein the movable member is configured to close the first chamber port in the first end position;
a second chamber port fluidly communicating with the fluid chamber, wherein the movable member is configured to close the second chamber port in the second end position;
a third chamber port fluidly communicating with the fluid chamber, wherein the third chamber port is open irrespective of a position of the movable member;
a first input port configured to receive a high pressure fuel flow from the supply line and fluidly connected with each of the first chamber port and the second chamber port;

a second input port configured to receive a low pressure fuel flow from a low pressure line and fluidly connected to the third chamber port;
a first output port fluidly connected to the first chamber port; and
a second output port fluidly connected to the second chamber port.

8. The fuel control system of claim 7, wherein the first stage unit further comprises:
a first orifice fluidly disposed between the first input port and the first chamber port; and
a second orifice fluidly disposed between the first input port and the second chamber port.

9. The fuel control system of claim 7, wherein the second stage unit further comprises:
a housing movably receiving the spool therein, the housing comprising a first port fluidly connected to an intermediate pressure line and a second port fluidly connected to the PRSOV, the housing and the spool defining a first end chamber fluidly connected to the first output port of the first stage unit and a second end chamber fluidly connected to the second output port of the first stage unit, wherein the first and second end chambers are disposed on opposing sides of the spool, the housing and the spool further defining an annular chamber disposed between the first and second end chambers and disposed in fluid communication with the first port, wherein the spool fluidly separates the first end chamber, the second end chamber, and the annular chamber from each other, wherein, in the first spool position, the spool fluidly separates the second port from the annular chamber, such that the second port is fluidly disconnected from the first port, wherein, in the second spool position, the spool fluidly connects the second port to the annular chamber, such that the second port is fluidly connected with the first port via the annular chamber; and
a biasing member received within the second end chamber and configured to bias the spool towards the second spool position,
wherein, in the first end position of the movable member, a fluid pressure within the first end chamber is higher than a fluid pressure within the second end chamber, such that the spool is in the first spool position against a biasing of the biasing member; and
wherein, in the second end position of the movable member, the fluid pressure within the first end chamber is less than or equal to the fluid pressure within the second end chamber, such that the spool is in the second spool position.

10. The fuel control system of claim 9, wherein, upon loss of electrical power to the stage actuating unit, the movable member moves to a neutral position between the first end position and the second end position, such that each of the first and second chamber ports is open, wherein, upon loss of electrical power to the stage actuating unit when the movable member is in the first end position, the movable member moves to the neutral position from the first end position, and wherein, upon the movement of the movable member from the first end position to the neutral position, the fluid pressure within the first end chamber tends to equalize with the fluid pressure within the second end chamber, such that the spool of the second stage unit moves to the second spool position over the predetermined time duration and the valve member of the PRSOV moves to the closed position after the predetermined time duration.

11. The fuel control system of claim 9, further comprising a pull-down orifice fluidly disposed between the delivery line and the intermediate pressure line, such that the pull-down orifice is fluidly connected to the first port via the intermediate pressure line.

12. The fuel control system of claim 9, further comprising:
a pump fluidly configured to provide a high pressure fuel flow to the supply line; and
a spill valve fluidly connected to the intermediate pressure line and configured to control a fuel flow between the supply line and the pump based on a fluid pressure in the intermediate pressure line.

13. The fuel control system of claim 1, wherein the stage actuating unit comprises one or more coils that are electrically powered, and wherein:
the one or more coils actuate the movable member to the first end position when the one or more coils are energized to a first current level;
the one or more coils actuate the movable member to the second end position when the one or more coils are energized to a second current level different from the first current level; and
loss of electrical power to the stage actuating unit causes a zero current level in the one or more coils.

14. The fuel control system of claim 1, wherein the first stage unit comprises a four-way proportional servo-valve.

15. The fuel control system of claim 1, further comprising a controller configured to control at least the valve actuating unit of the fuel metering valve and the first stage unit of the shutoff effector.

16. A gas turbine engine for an aircraft, the gas turbine engine comprising the fuel control system of claim 1.

17. A fuel control system for a gas turbine engine, the fuel control system comprising:
a fuel metering valve comprising:
a valve body configured to adjust a flow of a fuel between a supply line and a delivery line;
a valve actuating unit configured to move the valve body, wherein the valve actuating unit is electrically powered; and
a valve detent configured to retain the valve body in a current body position of the valve body upon loss of electrical power to the valve actuating unit;
a pressure raising and shut-off valve (PRSOV) fluidly connected to the delivery line and comprising a valve member movable between an open position and a closed position, wherein, in the open position, the valve member allows the flow of the fuel from the delivery line to an engine line that is in fluid communication with one or more burners of the gas turbine engine and wherein, in the closed position, the valve member prevents the flow of the fuel from the delivery line to the engine line; and
a shutoff effector comprising:
a first stage unit that is electrically powered; and
a second stage unit fluidly connected to the PRSOV and controlled by the first stage unit, wherein the second stage unit is configured to actuate the valve member of the PRSOV, the second stage unit comprising a spool movable between a first spool position and a second spool position, wherein, in the first spool position of the spool, the valve member of the PRSOV is in the open position, and wherein, in the second spool position of the spool, the valve member of the PRSOV is in the closed position;

wherein, upon loss of electrical power to the first stage unit when the spool is in the first spool position, the first stage unit is configured to:
control the second stage unit to move the spool to the second spool position over a predetermined time duration from loss of electrical power to the first stage unit, such that the valve member of the PRSOV moves to the closed position after the predetermined time duration and allows the flow of the fuel from the delivery line to the engine line during the predetermined time duration, wherein, after the predetermined time duration, the valve member of the PRSOV is at the closed position to prevent the flow of the fuel from the delivery line to the engine line; or
control the second stage unit to retain the spool in the first spool position, such that the valve member of the PRSOV is retained in the open position;
wherein the first stage unit comprises:
a movable member movable at least between a first end position corresponding to the first spool position of the spool of the second stage unit and a second end position corresponding to the second spool position of the spool of the second stage unit;
a stage actuating unit configured to actuate the movable member between the first end position and the second end position, wherein the stage actuating unit is electrically powered, such that loss of electrical power to the first stage unit corresponds to loss of electrical power to the stage actuating unit, wherein, in the first end position of the movable member, the first stage unit controls the second stage unit to move the spool to the first spool position, and, in the second end position of the movable member, the first stage unit controls the second stage unit to move the spool to the second spool position;
a fluid chamber at least partially receiving the movable member therein;
a first chamber port fluidly communicating with the fluid chamber, wherein the movable member is configured to close the first chamber port in the first end position;
a second chamber port fluidly communicating with the fluid chamber, wherein the movable member is configured to close the second chamber port in the second end position;
a third chamber port fluidly communicating with the fluid chamber, wherein the third chamber port is open irrespective of a position of the movable member;
a first input port configured to receive a high pressure fuel flow from the supply line and fluidly connected with each of the first chamber port and the second chamber port;
a second input port configured to receive a low pressure fuel flow from a low pressure line and fluidly connected to the third chamber port;
a first output port fluidly connected to the first chamber port; and
a second output port fluidly connected to the second chamber port.

18. A fuel control system for a gas turbine engine, the fuel control system comprising:
a fuel metering valve comprising:
a valve body configured to adjust a flow of a fuel between a supply line and a delivery line;
a valve actuating unit configured to move the valve body, wherein the valve actuating unit is electrically powered; and
a valve detent configured to retain the valve body in a current body position of the valve body upon loss of electrical power to the valve actuating unit;
a pressure raising and shut-off valve (PRSOV) fluidly connected to the delivery line and comprising a valve member movable between an open position and a closed position, wherein, in the open position, the valve member allows the flow of the fuel from the delivery line to an engine line that is in fluid communication with one or more burners of the gas turbine engine and wherein, in the closed position, the valve member prevents the flow of the fuel from the delivery line to the engine line; and
a shutoff effector comprising:
a first stage unit that is electrically powered; and
a second stage unit fluidly connected to the PRSOV and controlled by the first stage unit, wherein the second stage unit is configured to actuate the valve member of the PRSOV, the second stage unit comprising a spool movable between a first spool position and a second spool position, wherein, in the first spool position of the spool, the valve member of the PRSOV is in the open position, and wherein, in the second spool position of the spool, the valve member of the PRSOV is in the closed position;
wherein, upon loss of electrical power to the first stage unit when the spool is in the first spool position, the first stage unit is configured to:
control the second stage unit to move the spool to the second spool position over a predetermined time duration from loss of electrical power to the first stage unit, such that the valve member of the PRSOV moves to the closed position after the predetermined time duration and allows the flow of the fuel from the delivery line to the engine line during the predetermined time duration, wherein, after the predetermined time duration, the valve member of the PRSOV is at the closed position to prevent the flow of the fuel from the delivery line to the engine line; or
control the second stage unit to retain the spool in the first spool position, such that the valve member of the PRSOV is retained in the open position;
wherein the first stage unit comprises a four-way proportional servo-valve.

* * * * *